United States Patent [19]

Swanson et al.

[11] Patent Number: 4,781,129
[45] Date of Patent: Nov. 1, 1988

[54] DEBRIS AND SOIL SHAVER

[75] Inventors: Morton C. Swanson, Palouse; Guy J. Swanson, Spokane, both of Wash.

[73] Assignee: Swanson Spray and Manufacturing, Inc., Palouse, Wash.

[21] Appl. No.: 922,897

[22] Filed: Oct. 24, 1986

[51] Int. Cl.[4] .......................... A01C 5/06; A01B 35/28
[52] U.S. Cl. ...................................... 111/73; 172/574; 172/573; 172/603; 111/85; 111/87
[58] Field of Search ............... 172/572, 573, 574, 603, 172/551, 606; 111/73, 77, 87, 85, 88

[56] References Cited

U.S. PATENT DOCUMENTS

| | | | |
|---|---|---|---|
| 905,786 | 12/1908 | Biesenthal | |
| 1,024,208 | 4/1912 | Langley | 172/574 |
| 1,125,974 | 1/1915 | Davidson | 172/572 |
| 1,425,451 | 8/1922 | Conti | 172/602 |
| 2,210,813 | 8/1940 | Kriplean | 172/572 |
| 2,674,174 | 4/1954 | Altgelt | 172/742 |
| 2,734,439 | 2/1956 | Padrick | 111/52 |
| 3,061,018 | 10/1962 | Olson | 172/139 |
| 3,348,505 | 10/1967 | Smith | 111/73 |
| 3,362,731 | 1/1968 | Morrison, Jr. | 172/574 |
| 3,439,749 | 4/1969 | Olsson | 172/572 |
| 3,568,613 | 3/1971 | Lange | 111/86 |
| 3,611,956 | 10/1971 | Moore et al. | |
| 3,631,929 | 6/1972 | Gates | 172/198 |
| 3,642,073 | 2/1972 | Geurts | 172/196 |
| 3,718,191 | 2/1973 | Williams | 172/742 |
| 3,749,035 | 7/1973 | Cayton et al. | 111/85 |
| 3,799,079 | 3/1974 | Dietrich | 111/7 |
| 4,044,697 | 8/1977 | Swanson | 172/464 |
| 4,054,007 | 10/1977 | Moore | 111/6 |
| 4,116,140 | 9/1978 | Anderson et al. | 111/52 |
| 4,141,302 | 2/1979 | Morrison, Jr. et al. | 111/52 |
| 4,207,823 | 6/1980 | Steilen et al. | 111/85 |
| 4,307,674 | 12/1981 | Jennings et al. | 111/85 |
| 4,333,534 | 6/1982 | Swanson et al. | 111/85 |
| 4,377,979 | 3/1983 | Peterson et al. | 111/52 |
| 4,407,207 | 10/1983 | Dreyer | 111/85 |
| 4,422,392 | 12/1983 | Dreyer et al. | 111/52 |
| 4,425,973 | 1/1984 | Williams et al. | 172/574 |
| 4,452,315 | 10/1984 | Swanson | 172/156 |
| 4,483,401 | 11/1984 | Robertson | 172/574 |
| 4,489,787 | 12/1984 | Gary | 172/574 |
| 4,515,224 | 5/1985 | Currie | 112/572 |
| 4,596,200 | 6/1986 | Gafford | 111/85 |
| 4,611,545 | 9/1986 | Nickeson | 111/85 |
| 4,624,196 | 11/1986 | Anderson | 111/85 |

FOREIGN PATENT DOCUMENTS

| | | | |
|---|---|---|---|
| 29215 | 3/1925 | France | 172/603 |
| 2396498 | 3/1979 | France | 111/85 |

Primary Examiner—Richard J. Johnson
Attorney, Agent, or Firm—Wells, St. John & Roberts

[57] ABSTRACT

A debris and soil shaver for no till farming is disclosed which has a disk-like member which floats up and down as it is pulled across the ground surface. The disk is angled with respect to a predetermined direction of travel of an agricultural apparatus which is adapted to pull the shaver. The disk is rotatably mounted to a first support member about a central transverse disk axis. The first support member is pivotally mounted to a vertical second support member about a pivot axis. The pivot axis and central transverse axis are angled with respect to one another. The second support member is clamped to the agricultural apparatus which pulls the shaver. With such a construction, pivotal movement of the first support member about the pivot axis causes the angle of the disk relative to the ground surface to change. The angle adjusting prevents the disk from engaging too much soil and allows the disk to seek a path of least resistance as it rolls across a planting field. The blade angle is also changeable by raising and lowering the second support member relative to the agricultural apparatus to vary the elevation of the pivot axis above the ground. A plurality of shavers can be mounted to tool bars to cooperatively neatly stack residue between seed rows.

25 Claims, 7 Drawing Sheets

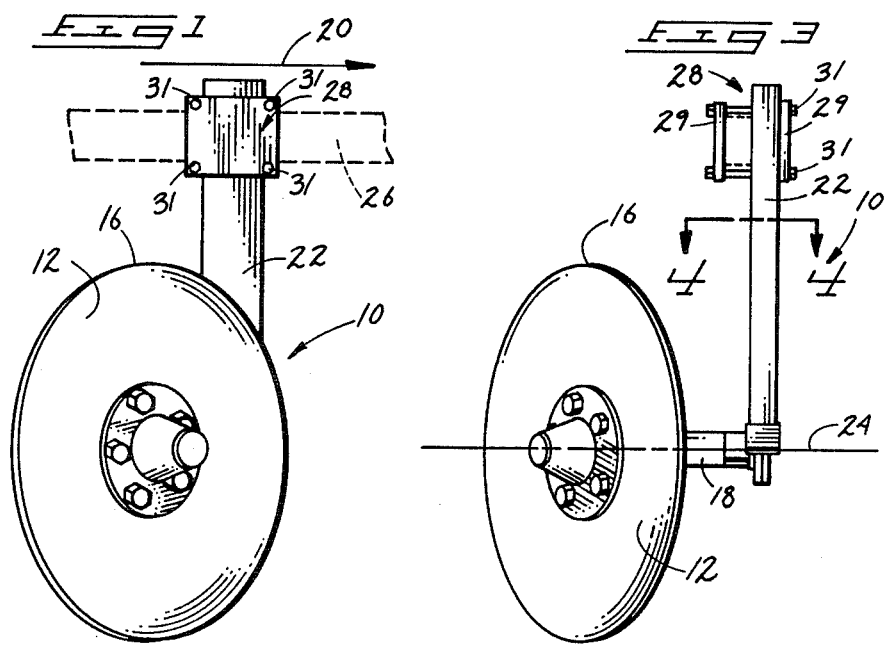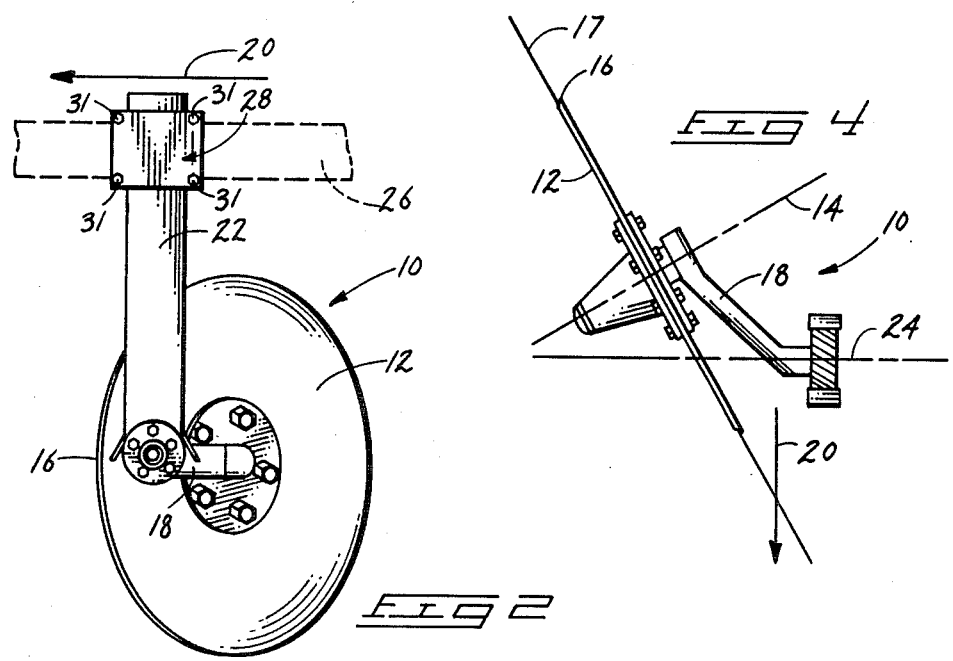

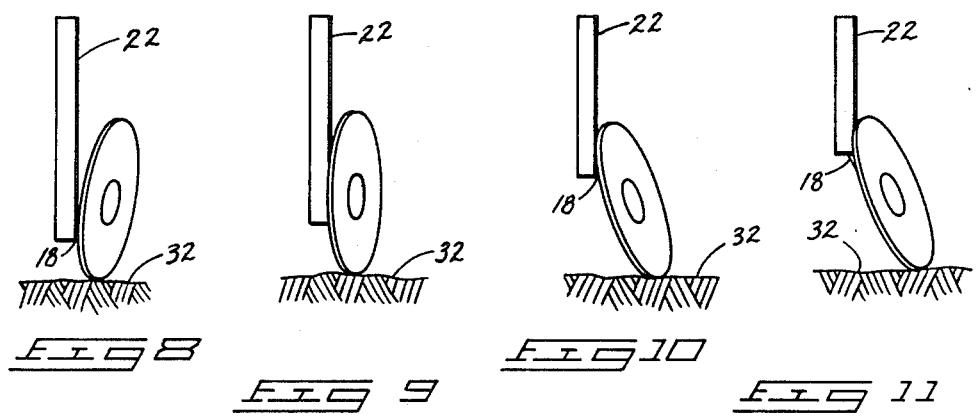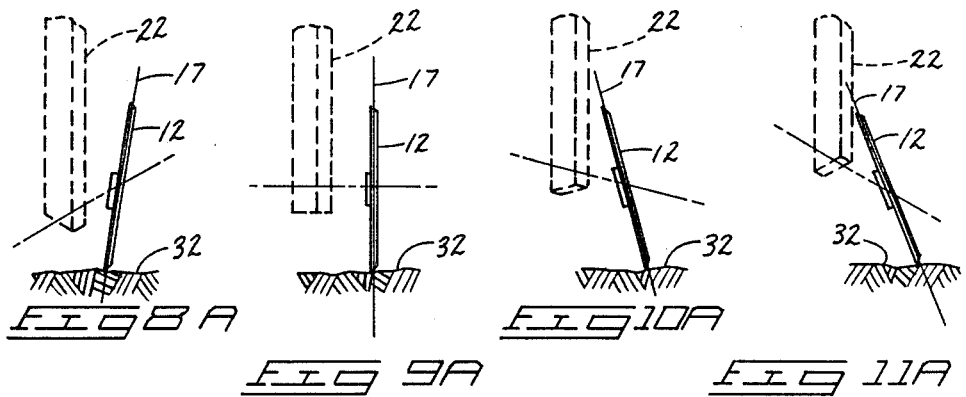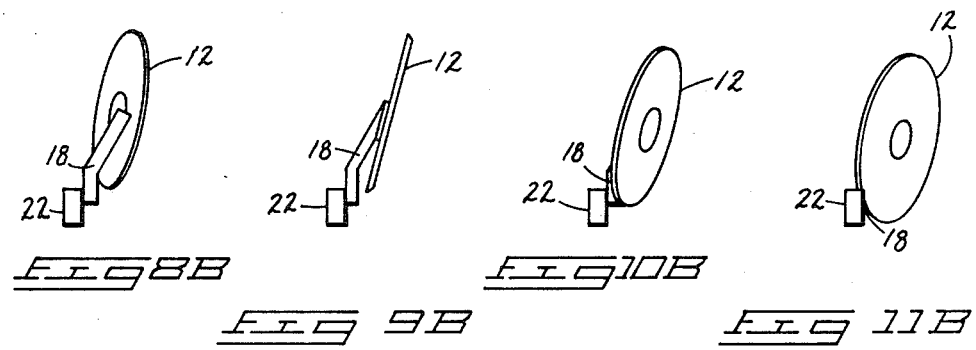

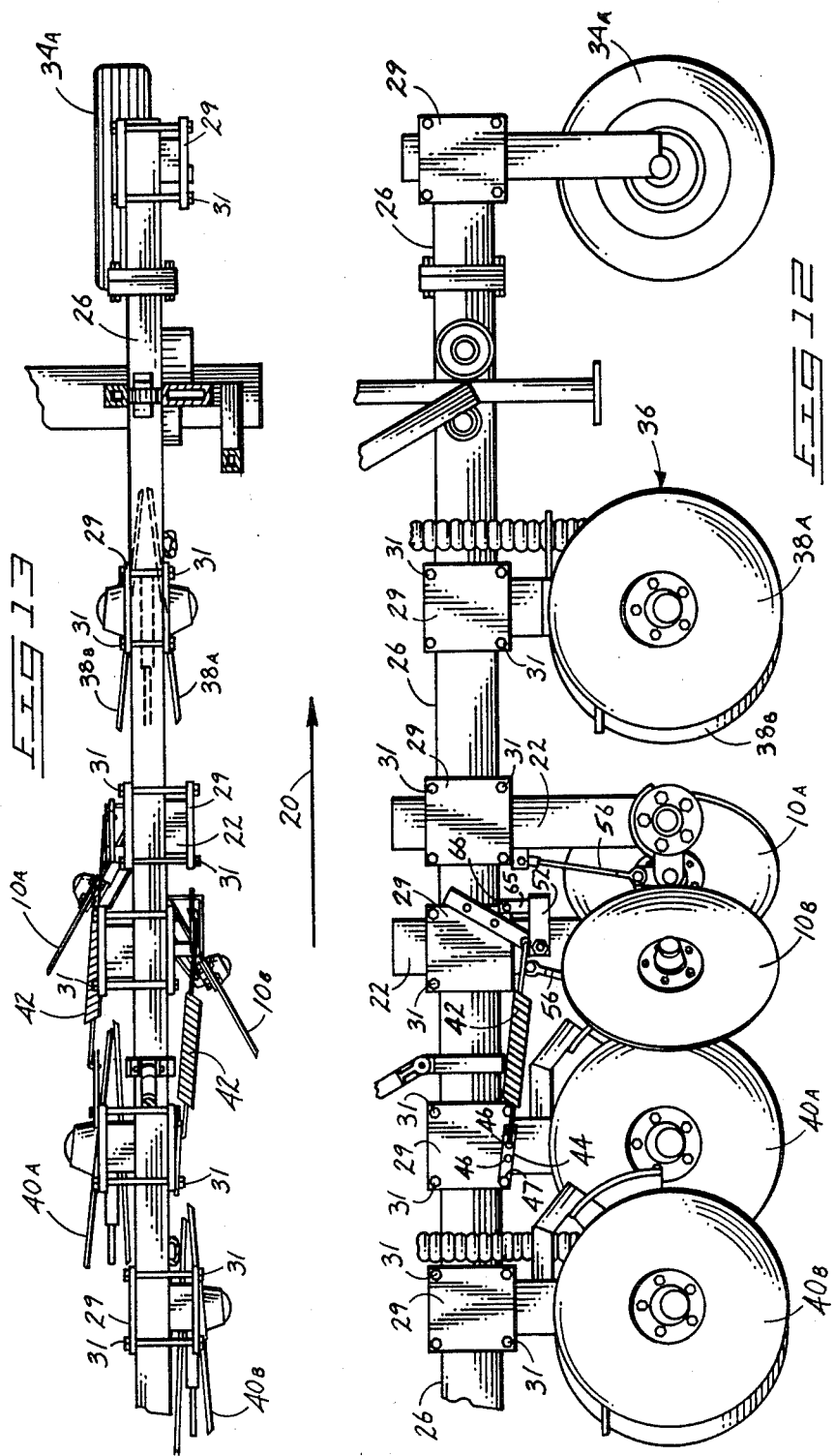

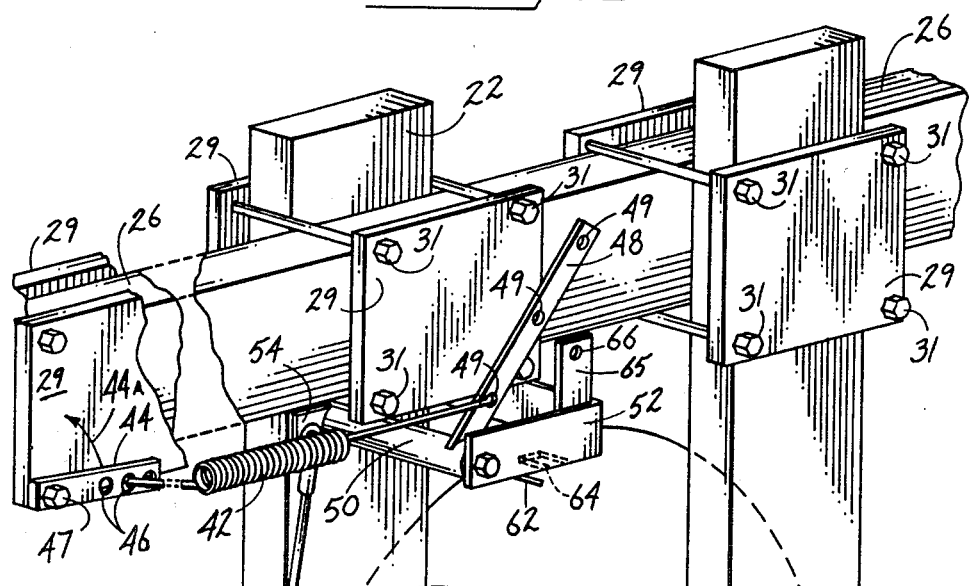
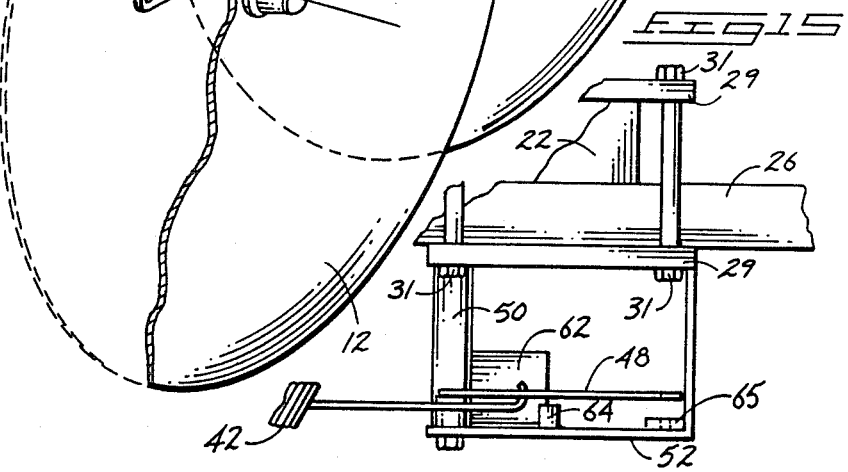

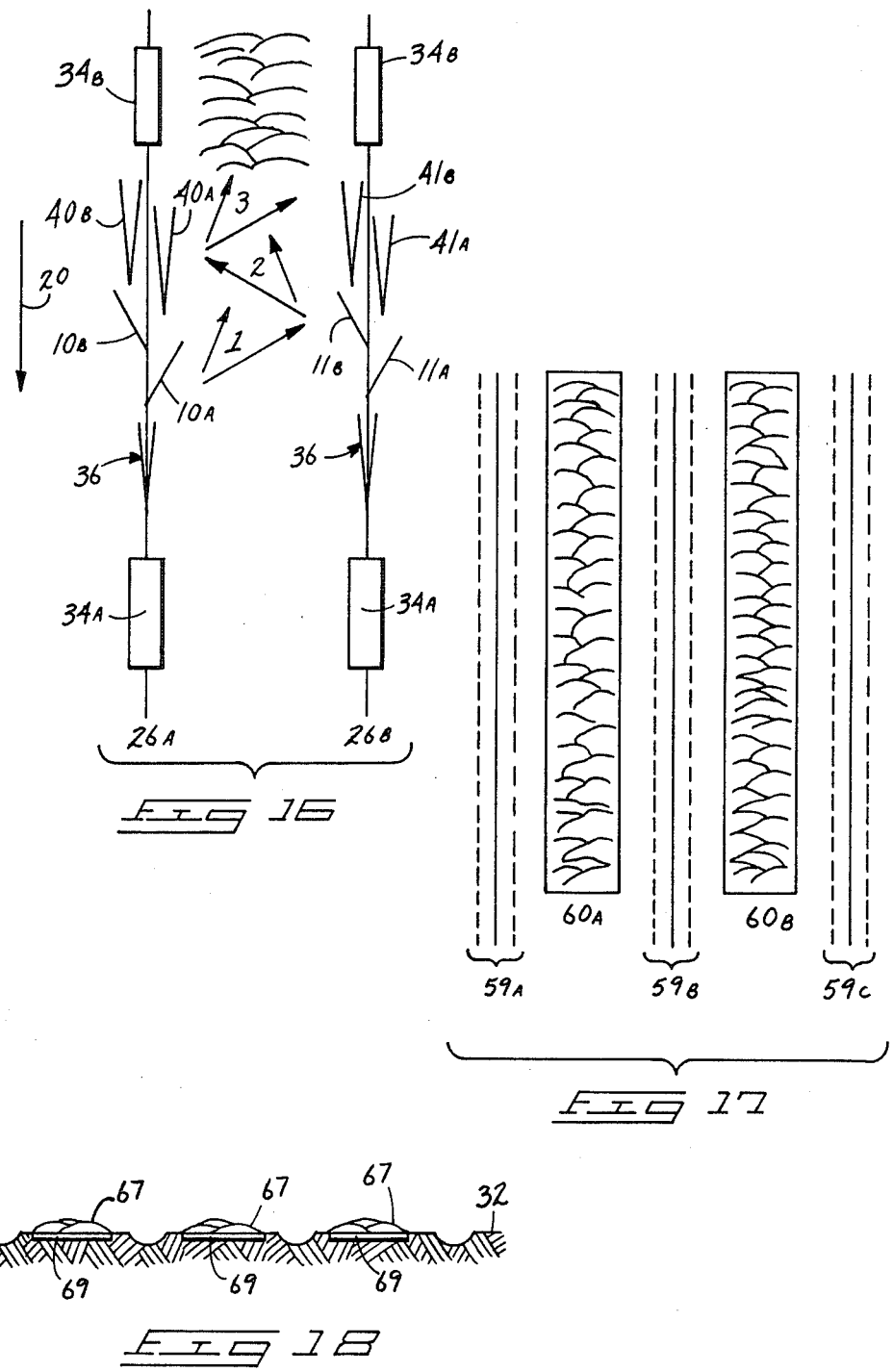

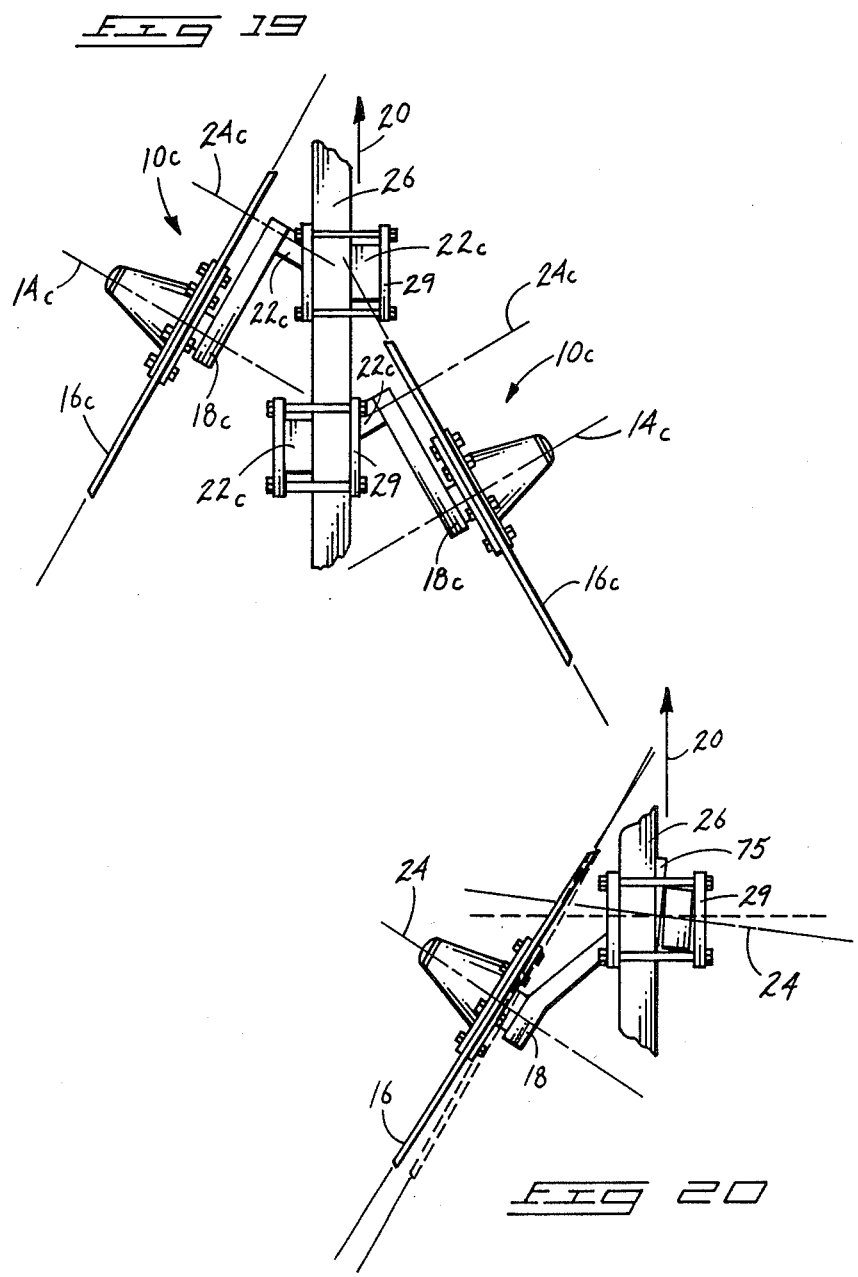

DEBRIS AND SOIL SHAVER

TECHNICAL FIELD

This invention relates generally to agricultural planting equipment, and more particularly to agricultural planting equipment used in farming where the soil is not generally tilled.

BACKGROUND OF THE INVENTION

In recent years, there has been increased development in equipment and techniques for farming without tilling the entire surface of a planting field. Such farming is generally referred to as "no-till" farming. With no-till farming, the stubble from a crop from a preceeding growing season remains uncultivated during a subsequent planting and growing season. Seed for the new crop is simply planted through the stubble of the previous season's crop.

No-till farming techniques generally rely upon a disk type soil opener to break the surface of the soil in a localized area so that seed, fertilizer, and other agricultural chemicals can be placed directly into the soil. When disk type soil openers are used, it is necessary for the disk to penetrate into the soil to open a furrow into which the seed or other materials can be placed. Because the field has generally not been cultivated, there is usually straw or other stubble type debris on the ground surface. The disk soil openers must penetrate the debris for engaging the topsoil, and laterally directing the residue and soil away from the furrow being formed.

In no-till farming, it is desirable that all the rotting debris and residue be scraped clear of the furrow where seed is to be placed. No-till farming has suffered from difficulties caused by residue being tucked into the furrow by the soil opener. Residue tucked into the furrow can add to problems associated with various plant diseases such as pythium. In addition to disease, debris in the furrow also inhibits good seed germination and seeding emergence.

Residue and rotting debris can be beneficial when scraped clear of the furrow and localized adjacent thereto. The residue helps the soil to retain moisture adjacent the furrows. Additionally, the residue prevents exposure of the furrows to extreme temperatures and wind. Further, the concentration of residue material in rows adjacent the furrows results in the residue feeding upon itself creating more organic life and corresponding nutrients for the soil. Accordingly, residue can be extremely beneficial when properly manipulated within the seed zone.

It is also desirable that seed be placed within the soil at a predetermined depth. The desired depth varies with different seed varieties. Additionally, for a given seeding it is desirable that seed be placed at a uniform depth from the ground surface. Optimum crop yield can be significantly affected if seed placement depth varies as much as one inch. Seed placed at an even depth across a planting field assures that all plants germinate and emerge from the ground together. Two or more germination dates will retard late emerging seedlings and correspondingly reduce yields substantially.

The prior art includes an apparatus referred to as a "duff scuffer" for scraping residue away from a line where seed will be placed. The duff scuffer is a fixed, conical disk angled from the direction of vehicle travel which is slid along the ground in front of the soil openers. Duff scuffers can be positioned to be very aggressive in removing residue and soil in the seed zone if desired. However, duff scuffers suffer from severe limitations. For example, duff scuffers can only be used with rows having a spacing for which they were designed, such as the common 15 inch spacing. Further, duff scuffers remove varying amounts of residue and soil as they travel over varying sloped terrain. This results in too little or too much material being removed as terrain varies. Accordingly, the depth of a furrow created can vary significantly causing seed to be placed at different depths across the field.

Another prior art device similar to the duff scuffer, referred to as a "residue reliever", was designed to remove debris from narrowly spaced seed rows. The residue reliever was a straight disc which was also angled from the direction of vehicle travel to move straw and other debris away from the seed row. Two residue relievers could be mounted to each tool bar of a seeding machine for removing debris from the narrowly spaced rows being formed. The residue relievers were mounted to the tool bar such that all debris was caused to flow in one lateral direction relative to the direction of seeding machine travel. Residue relievers had drawbacks similar to those of the duff scuffer, such as removing varying amounts of residue and soil as they are caused to travel over various slope terrain. Additionally, at higher travel speeds the residue relievers caused debris scraped from one row to be forced into an adjacent row causing debris to be imbedded therein. Further, the scraping of material into one lateral direction necessitated that the seeding machine be operated in only one direction around a planting field to prevent debris being scraped in a given path of travel from flowing into a previously created path.

Accordingly, a need remains for a device which more effectively scrapes residue from the front of seed openers and concentrates the residue in rows adjacent furrows.

BRIEF DESCRIPTION OF THE DRAWINGS

The preferred embodiment of the invention is illustrated in the accompanying drawings, in which:

FIG. 1 is a side view of a first side of a debris and soil shaver in accordance with the invention;

FIG. 2 is a side view of a second side, opposite the first side, of the debris and soil shaver of FIG. 1;

FIG. 3 is a front end view of the debris and soil shaver of FIG. 1;

FIG. 4 is a top view of the debris and soil shaver of FIG. 1;

FIGS. 8, 9, 10 and 11 are end views of the debris and soil shaver of FIG. 1 shown positioned in four different operative positions for removing soil residue in different degrees;

FIGS. 8A, 9A, 10A, and 10A are diagrammatic angled views of the debris and soil shaver as shown in FIGS. 8, 9, 10 and 11, respectively;

FIGS. 8B, 9B, 10B, and 11B are top views of the debris and soil shaver as shown in FIGS. 8, 9, 10 and 11, respectively;

FIG. 12 is a side view of a seed drill tool bar having a pair of debris and soil shavers in accordance with the invention secured thereto, as well as other seeding apparatus;

FIG. 13 is a top view of the tool bar of FIG. 12;

FIG. 14 is an enlarged perspective view of a portion of the tool bar of FIG. 12 illustrating mounting of a debris and soil shaver thereto in accordance with the invention;

FIG. 15 is a top view of a downward movement limiting means of the debris and soil remover, in accordance with the invention;

FIG. 16 is an overhead schematic view of a pair of tool bars employing a plurality of debris and soil shavers in accordance with the invention, which cooperate to produce a desired result;

FIG. 17 is a top view of a field as seeded by use of a device as shown in FIG. 16;

FIG. 18 is cross-sectional view of a planting field having seed and herbicide positioned therein;

FIG. 19 illustrates another embodiment of a debris and soil shaver, and is a top view of a pair of such shavers mounted to a tool bar; and FIG. 20 is a top view of a debris and soil shaver in accordance with the invention employing a shim for adjusting a disk angle relative to direction of vehicle travel.

DETAILED DESCRIPTION OF THE PREFERRED EMBODIMENTS

Figure 5:
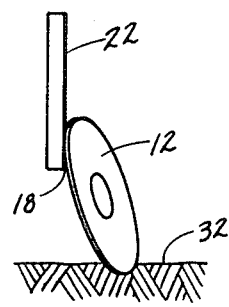
FIG. 5 is a front end view of the debris and soil shaver of FIG. 1, shown slightly engaging into the ground surface.

The following disclosure of the invention is submitted in compliance with the constitutional purpose of the Patent Laws "to promote the progress of science and useful arts" (Article 1, Section 8).

Referring to FIGS. 1-4, a debris and soil shaver in accordance with the invention is generally indicated with reference numeral 10. Shaver 10 is adapted for mounting to an agricultural apparatus for pulling of shaver 10 across the ground surface. Shaver 10 includes a disk-like member 12 having a central transverse axis 14. Disk 14 is rotatably mounted to a first support member 18 for rotation about its transverse axis 14. Alternately, disk 12 could be fixedly mounted to first support member 18. Rotatable mounting is preferred to enable disk 12 to rotate as it travels across the ground to provide an even wearing of the disk, and permit the material to be lifted through a seed drill by a rotating member that continuously forces flow of material, rather than remaining stationary which can lead to plugging. Disk-like member 12 can be of any of a variety of constructions, such as flat, concave dish-like, conical or other shapes. As shown, disk 12 is flat, having a disk periphery 16 defining a disk plane 17. Disk plane 17 is angled relative to central transverse axis 14 by ninety degrees.

Shaver 10 is adapted to be mounted to a frame member 26 of an agricultural apparatus which is adapted to travel across the ground surface in a predetermined direction 20. As shown, the first support member trails from the direction of travel and is also angled from the direction of travel. Central transverse disk axis 14 is arranged at an oblique angle relative to direction of travel 20. The angle of the disk plane 17 relative to vehicle travel is correspondingly angled at ninety degrees from the oblique angle formed by axis 14 and direction of travel 20. Any of a variety of angles of disk plane 17 relative to direction of travel 20 could be used, with ten to thirty-five degrees being the preferred range. The figures illustrate this angle as being an approximate thirty degrees. The degree with which disk plane 17 is angled relative to the direction of vehicle travel has a certain effect on an angle change function, which will be more fully described below.

First support member 18 is pivotally mounted to a vertical second support member or stand 22 for relatively unrestrained pivotal movement about a pivot axis 24. Pivot axis 24 is spaced from and arranged at an angle relative to central transverse disk axis 14. As shown, pivot axis 24 is normal to direction of travel 20.

Second support member 22 is mounted to frame member 26 of an agricultural apparatus adapted to pull remover 10 by a clamp 28. Clamp 28 is comprised of a pair of plates 29 which releasably clamp second support member 22 to frame member 26 by four corner bolts 31. Clamp 28 permits second support member 22 to be selectively moved elevationally relative to frame member 26 to adjust the elevation of pivot axis 24 above the ground surface. The elevational adjustability of second support member 22 by this clamp provides a surface angle adjusting means for varying an angle with which disk plane 17 engages the ground surface, as will be more fully described below.

Figure 6:
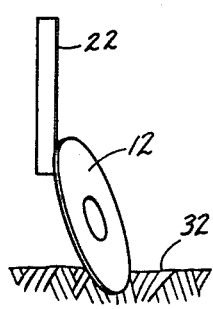
FIG. 6 is a front end view of the debris and soil shaver of FIG. 1, shown more deeply engaging the ground surface than in FIG. 5.
Figure 7:
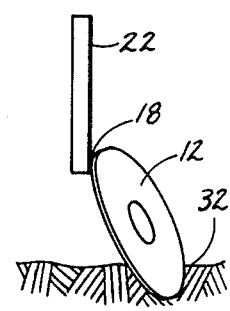
FIG. 7 is a front end view of the debris and soil shaver of FIG. 1, shown even more deeply engaging the ground surface.

The second support member, as mounted to frame member 26 effectively provides a means for pivotally mounting the first support member relative to frame member 26. Also, the pivotal mounting of first support member 18 to second support member 22 provides a floating or operative connection between frame member 26 and first support member 18. This allows floating elevational movement of disk 12 relative to frame member 26 as frame member 26 is caused to travel across the ground surface. This operative connection, in combination with disk axis 14 and pivot axis 24 being angled relative to one another, results in the angle of disk plane 17 from vertical changing as first support member 18 pivots relative to second support member 22. FIGS. 5, 6, 7, and their respective associated "A" and "B" views, best illustrate this feature.

Figure 5A:
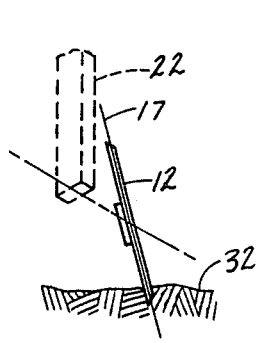
FIG. 5A is a diagrammatic angled view of the debris and soil shaver as shown in FIG. 5.
Figure 6A:
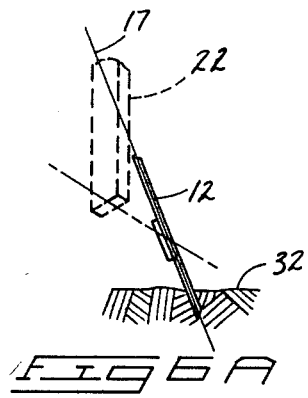
FIG. 6A is a diagrammatic angled view of the debris and soil shaver as shown in FIG. 6.
Figure 7A:
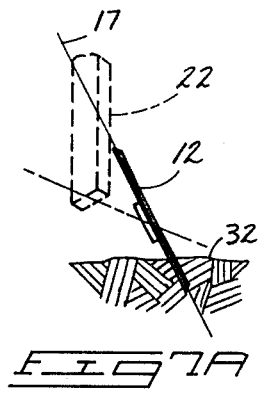
FIG. 7A is a diagrammatic angled view of the debris and soil shaver as shown in FIG. 7.
Figure 5B:
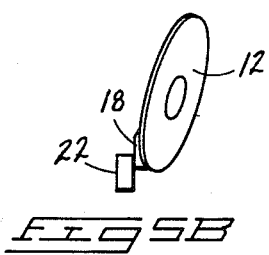
FIG. 5B is a top view of the debris and soil shaver as shown in FIG. 5.
Figure 6B:
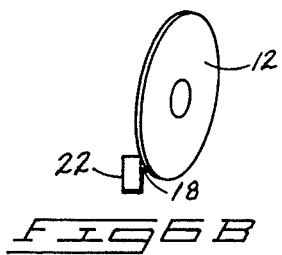
FIG. 6B is a top view of the debris and soil shaver as shown in FIG. 6.
Figure 7B:
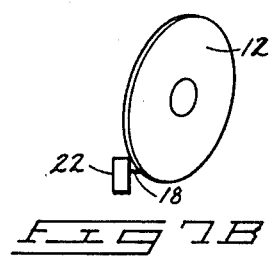
FIG. 7B is a top view of the debris and soil shaver as shown in FIG. 7.

Each of FIGS. 5, 6, and 7 are longitudinal, end views of the debris and soil remover looking opposite to direction of travel 20. The corresponding "B" views are top views. The corresponding "A" views are edge views looking down disk plane 17. The position of disk plane 17 changes from FIG. 5 to 7. In such figures, clamp 28 is shown firmly clamping second support member 22 to frame member 26 at the same elevational position. Also, disk 12 is shown engaging into a ground surface 32 at different depths in each figure due to downward biasing the result of gravity. Looking first at FIGS. 7, 7A and 7B, as first support member 18 pivots downwardly with respect to second support member 22, the bottom of disk 12 pivots outward and the top of disk 12 pivots inward. This causes disk 12 to steeply angle into ground surface 32, which would cause aggressive debris and soil removal. As shown in FIGS. 5, 5A, and 5B, as first support member 18 pivots upwardly relative to second support member 22, the angle with which disk 16 (disk plane 17) engages ground surface 32 from vertical is decreased, which would cause less aggressive soil removal. Accordingly, as disk 12 moves up and down by pivot action about axis 24, the angle of engagement with respect to surface 32 of disk plane 17 changes. This provides a self-adjusting feature of the disk as it is caused to travel across the ground surface. For example, as disk 12 goes deep into the soil as illustrated in FIG. 7, the angle of disk plane 17 relative to vertical becomes greater, forcing the disk blade back out. As the disk blade is forced back out, gravity will force the blade back into the ground surface. Accordingly, this floating movement prevents the disk blade from engaging too much or too little soil, and allows the disk blade to seek a path of least resistance as it travels across the ground surface, as illustrated in FIG. 6. As will be more fully described below, stops or other means can also be employed for limiting the upward and downward pivotal movement of first support member 18 relative to second support member 22.

The angle with which disk plane 17 is angled relative to direction of travel 20 is also understood to change as first support member 18 pivots with respect to second support member 20. As the disk goes deeper into the ground, the angle of disk plane 17 away from the direction of travel becomes greater, which also forces the disk upwardly from surface 32. The pivot action about axis 24 is believed to have a greater effect on the angle which with disk plane 17 is angled relative to ground surface 32 (vertical), than the effect on the angle of disk plane 17 relative to the direction of travel.

It may be desirable to change the initial angle at which the disk engages the ground surface, as when planting different seed types. In such instance, the weight of the disk and first support member will cause the disk to find some new path or angle of least resistance which will more or less aggressively move soil and debris. This initial angle change is accomplished by raising and lowering second support member 22 relative to frame member 26 to correspondingly raise or lower pivot axis 24 relative to ground surface 32. This disk angle changing relative to the ground surface is best illustrated with reference to FIGS. 8, 9, 10, and 11, and their associated "A" and "B" figures.

As shown, changing the elevation of pivot axis 24 above ground surface 30 changes the angle of inclination of disk plane 17 and corresponding disk 12 relative to vertical. FIGS. 9, 9A, and 9B illustrate a position of second support member 22 which positions pivot axis 24 such that disk 12 is aligned vertically relative to ground surface 31. Such a position would be employed when primarily scraping residue, as opposed to soil, from the ground surface. As shown in FIGS. 8, 8A and 8B, lowering second support member 22, and correspondingly pivot axis 24, causes first support member 18 to slant upwardly to disk 12. In this manner, disk 12 is angled slightly from vertical. The top of disk 12 is moved outwardly and the bottom of disk 12 inwardly such that disk 12 will be caused to scrape along ground surface 32 as it is dragged by the agricultural apparatus. Such a position would be employed for even less aggressive scraping of residue than by the position shown in FIG. 9. As illustrated in FIGS. 10, 10A and 10B, raising of second support member 22 relative to the position shown in FIG. 8 results in first support member 18 slanting downward to disk 12. In this manner, the top of disk 12 is caused to pivot rearwardly engaging the lower portion of disk 12 at a steeper angle to ground surface 32 relative to vertical. Further raising of second support member 22 causes this angle to further steepen, as illustrated in FIGS. 10, 10A and 10B. These latter two positions would be used for aggressive soil removal as well as debris removal. Accordingly, one can vary the degree at which soil and residue will be removed by varying the elevation of pivot axis 24 above ground surface 30.

The angle with which disk 12 is angled relative to direction of travel 20 will affect the degree of angle change of disk plane 17 upon pivoting about pivot axis 24. As shown, first support member 18 angles disk 12 at thirty degrees from direction of travel 20. Increasing this angle would amplify the degree of angle change of disk plane 17 relative to vertical for a given pivot movement of first support 18 about axis 24.

Referring more particularly to FIGS. 14 and 15, means can be provided for limiting both the upward and downward movement of disk 12 relative to ground surface 32. Means in addition to gravity can also be provided for downwardly biasing disk 12 into the ground for creating a deep seed furrow, which may be desirable in certain seeding applications. This additional downward biasing can be effected by using a spring and levered jack shaft arrangement. As shown, a spring 42 is anchored at one end to the agricultural apparatus, and at the other to the pivotal debris and soil shaver. More particularly, spring 42 is connected at one end to a rectangular, elongate bar 44 having three holes 46. Holes 46 are adapted to receive one end of spring 42. Spring 42 is shown connected in the middle hole. Bar 44 is secured to tool bar 26 by a bolt 47. As shown, bar 44 can be rotated upwardly as indicated by arrow 44A to stretch sring 42 and correspondingly increase the biasing effect. Alternately, the end of spring 42 could be received by the innermost end hole 46 to increase the biasing effect. Decreasing of the biasing effect could be accomplished by securing spring 42 to the other, outermost end hole 46. The opposite end of spring 42 is connected to a levered jack shaft which is operatively connected to first support member 18.

More particularly, the opposite end of spring 42 is connected to an elongate lever 48 which is connected to one end of a jack shaft 50. Elongate lever 48 includes a plurality of holes 49 extending along its length which are adapted to receive an end of spring 42. The end of spring 42 is shown connected through the lowermost hole. Jack shaft 50 is pivotally supported by a bracket 52. The pivot axis of jack shaft 50 is at ninety degrees to the direction of travel 20 of the seed drill, and correspondingly parallel to pivot axis 24 of debris and soil shaver 10. The end of jack shaft 50 opposite where lever 48 is connected includes a second shorter lever 54. An end of a length adjustable tie rod 56 is pivotally connected to lever 54. The opposite end of length adjustable tie rod 56 pivotally connects to an elongate rectangular bar lever 55. Lever 55 is connected to first support member 18, and has a plurality of holes 57 adapted to pivotally receive an end of tie rod 56.

Rearward movement of lever 48, as illustrated in FIG. 12, 14, rotates jack shaft 50 counterclockwise which forces lever 54 downward to force tie rod 56 against lever 55 which forces disk 12 into the ground. Since spring 42 biases lever 48 rearwardly, disk 12 as shown is further biased into the ground. The degree of biasing can be varied by the relative pivotal position of bar 44 or by which of holes 46 and 49 the ends of spring 42 are received, as mentioned previously. This additional downward biasing is employed to both deeply furrow a seed row, and also to prevent skipping of disk 12 from the ground surface which might occur at higher seed drill speeds.

Stops or limiters can be provided with jack shaft 50 to prevent excessive upward and downward movement of disk 12 relative to the ground. As shown, the upward movement of disk 12 is limited by the biasing effect of spring 42. Downward movement is limited by a stop tab. Jack shaft 50 includes a radial bar projection 62 positioned at one end of jack shaft 50 circumferentially spaced from lever 48. A corresponding stop tab 64 projects inwardly from a side of bracket 52 parallel to the longitudinal direction of jack shaft 50. Jack shaft 50 is capable of pivoting counterclockwise to the point where radial projection 62 bears against stop tab 64. This limits the downward movement of disk 12 into the ground surface.

Bracket 52 also includes an upwardly extending bracket portion 65 having a hole 66 extending through the upper end thereof. Bracket portion 65 serves as a means for enabling disk 12 to be raised from ground surface 32 for placing it in an inoperative position. Elongated lever 48 can be swung downwardly (clockwise as shown) to cause the middle hole 49 to align with hole 66. A bolt or other object can then be slid through aligned holes 66 and hole 49 to hold disk 12 above the ground surface.

With the foregoing levered jack shaft arrangement, adjustment of the degree which disk 12 engages into the ground can be varied in a number of ways. The primary adjustment is by loosening bolts 31 of clamp 28 to vertically move stand 22 relative to tool bar 26. This moves pivot axis 24 to cause the angle of disk plane 17 to change, as previously described. Second, length adjustable tie rod 56 can be elongated to force disk 12 more deeply into the ground surface. Additionally, the end of tie rod 56 connected to lever 55 on the first support arm can be positioned through a different of holes 57. This serves to raise or lower disk 12 as desired. The tie rod length and which of holes 57 its lower end is received by can also be varied to limit or extend downward movement of disk 12.

The angle of pivot axis 24 relative to the direction of vehicle travel, and correspondingly the angle with which disk plane 17 is angled with respect to the direction of vehicle travel, can also be varied independently of vertical adjustment of pivot axis 24 relative to the ground surface. As shown in FIG. 20, a shim or wedge-like member 75 can be interposed between tool bar 26 and second support member 22 to change the angle of pivot axis 24 relative to the direction of vehicle travel to something other than ninety degrees. As shown in FIG. 20, pivot axis 24 has been rotated clockwise by shim 75 to increase the angle of plane 17 relative to the direction of vehicle travel. It may be desirable to so adjust a debris and soil shaver of a sepcific construction to clear a wider path or prevent excessive soil movement in certain soil types. Such shims provide an example of a means for adjusting the angle of pivot axis 24, and correspondingly disk plane 17, relative to the direction of vehicle travel.

FIGS. 12-16 illustrate how a debris and soil shaver in accordance with the invention can be employed with farm implements such as seed drills to produce a desired result of clearing debris and soil for placement of seed at a constant, desired predetermined depth. Referring particularly to FIGS. 12-14, a single frame member or tool bar 26 of a paired row seed drill is illustrated having a plurality of cooperating seed depositing devices positioned thereon. Paired row seed drills operate by placing a pair of rows of seeds in very close proximity to one another, such as three or five inches. A seed drill creates a plurality of such paired rows which are spaced a greater distance apart, such as nine or fifteen inches. Debris and soil shavers could also be used with triple or other multi-rowed seeding of crops, which we are exploring and are expected to be included in subsequently filed patent applications.

In accordance with the invention, a paired row seed drill tool bar 26 has a plurality of cooperating components attached thereto. A depth wheel 34A is mounted at the fore end of tool bar 26. Mounted rearwardly adjacent depth wheel 34A is a component commonly referred to as a deep bander 36, which is used to place a band of fertilizer deep within the soil. Deep bander 36 includes a pair of angled disk-like blades 38A, 38B. Each disk places a band of fertilizer within the soil for each row of seed which will subsequently be placed within the soil. Mounted directly behind the deep banders 36, are a pair of soil and debris shavers 10A, 10B. A leading soil and debris shaver 10A is positioned to one side of and at a longitudinal position along tool bar 26. A trailing debris and soil shaver 10B is positioned at the opposite side of tool bar 26 at a rearwardly spaced location from that of shaver 10A. Leading shaver 10A is adapted to clear debris and soil for one of the paired rows of seed, while trailing shaver 10B is adapted to remove debris and soil for the other of the paired rows.

Leading shaver 10A is longitudinally aligned with an intermediate soil opener 40A connected to tool bar 26 at a location rearward of shaver 10A. Accordingly, shaver 10A serves to clear a path for soil opener 40A to more effectively and accurately place a row of seed into the soil. A corresponding rear soil opener 40B is placed rearwardly adjacent of soil opener 40A in a longitudinal path which is aligned with shaver 10B. In the same manner, shaver 10B serves to clear a path for soil opener 40B, enabling it to more accurately and effectively place a row of seed at a predetermined depth within the soil. Accordingly shavers 10A and 10B function as independently operable units for clearing residue and soil ahead of soil openers 40A and 40B, respectively. A trailing depth wheel 34B is operatively connected to tool bar 26 rearwardly of soil opener 40B.

Referring more particularly to FIG. 16, a pair of debris and soil shavers 10A, 10B and 11A, 11B are employed with each tool bar 26A, 26B, respectively. FIG. 16 illustrates how a pair of adjacent tool bars having debris and soil shavers operatively connected thereto cooperate to produce a desired concentration of debris and residue between adjacent pairs of paired seed rows. For purposes of illustration, the leading and trailing debris and soil shavers of an adjacent bar are numbered 11A, 11B respectively, and the leading and trailing soil openers of the same bar are numbered 41A, 41B. The disks of debris and soil shavers 10A and 11B, which face one another, cooperate to effectively create a row of debris between adjacent paired rows. As shown, first residue shaver 10A removes debris and soil for the first soil opener 40A on tool bar 26A. The residue so removed is lifted and transferred in the direction of arrows 1 towards the adjacent tool bar 26B. The direction of residue flow is toward the trailing debris and soil shaver 11B on adjacent tool bar 26B. This trailing shaver 11B on adjacent tool bar 26B serves two functions. It first serves to remove soil and debris for its associated soil opener 41B. Second, it receives part of the residue deflected by leading shaver 10A on tool bar 26A and directs the combined debris and soil along arrows 2. Accordingly, material from trailing shaver 11B is transferred and stacked in a dead band area between the two paired rows created by the components connected to bars 26A and 26B.

Some overshoot of material can occur by the deflection of material from shaver 11B. Leading soil opener 40A on bar 26A acts as a rolling baffle and deflects material therefrom along arrows 3, causing it to roll back onto the dead band area. Accordingly, soil and debris are caused to be neatly stacked between the adjacent paired rows of seed.

The degree with which disk plane 17 is angled with respect to the direction of vehicle travel will depend upon the spacing between tool bars 26. Accordingly, differently constructed debris and soil shavers 10A, 10B can be employed for different width seed drills. Alternately, shims 75 can be employed to vary the angle of disk plane 17 with respect to the direction of vehicle travel. Generally, the closer the tool bars are positioned, the smaller the angle of disk plane 17 relative to the direction of vehicle travel to produce the desired residue flow management for neatly stacking of soil and residue between seed rows. As the distance between tool bars becomes greater, the angle of disk plane 17 relative to direction of vehicle travel should be increased to produce the desired residue flow management.

Also, the greater the angle between central transverse disk axis 14 and pivot axis 24, the greater will be the angle change of disk plane 17 relative to the ground surface for a given pivotal movement of first support member 18 about pivot axis 24.

The artisan will appreciate that many variations of these different angles can be employed to produce desired residue scraping or furrowing results.

FIG. 19 illustrates a modified debris and soil shaver usable with a paired row seeding apparatus as schematically laid out in FIG. 16. FIG. 19 is a top view of a pair of such shavers mounted to a tool bar. Modified debris and soil shaver 10C each include a disk 16C having a central transverse axis 14C about which disk 16C rotates. A first support member 18C is connected at one end to disk 16C for rotation of disk 16C about central transverse axis 14C. The opposite end of first support member 18C is pivotally connected to a second support member 22C for pivotal movement about a pivot axis 24C. Pivot axis 24C is parallel to central transverse disk axis 14C. Second support member 22C is clamped to tool bar 26. With such a construction, pivotal movement of first support member 18C about pivot axis 24C causes disk 16C to move vertically. However, because of the parallel orientation of pivot axis 24C relative to disk rotation axis 14C, such pivotal movement will not result in a change of the angle of disk 16C either to the direction of vehicle travel nor with respect to the ground surface. Accordingly, a floating or pivotal connection is provided for floating movement of the disk relative to the tool bar although no angle change occurs by such floating or pivotal movement. With such a construction, it would not be necessary to provide elevational adjustment of pivotal axis 24C as no angle change of disk 16C relative to the ground surface would be achieved by elevational movement. FIG. 19 illustrates a modification of a floating shaver which might be used in paired row or other multi-row seeding, in accordance with the invention. The artisan might also envision other soil and debris removers floatably mounted to a tool bar in accordance with the invention which would produce the desirable effects of concentrating debris and soil adjacent seed rows.

FIG. 17 illustrates the end result of three tool bars of a paired row seed drill operatively employing devices in accordance with the invention. Three paired seed rows 59A, 59B, 59C are created, with debris and soil rows 60A and 60B banded therebetween. The rows of debris and soil produce the desired effects of concentrating moisture between the seed rows and aiding the seed rows in preventing overexposure to the cold and wind.

Use of a seed drill as previously described additionally enables a band or herbicide to be more effectively placed and used in the area between adjacent pairs of seed rows, as shown in FIG. 18. Herbicide is placed in the dead band area ahead of the debris and soil shavers. The debris and soil shavers then effectively cover this herbicide creating a herbicide band 69 beneath the debris and soil 67. When so placed, such herbicide is less susceptible to displacement by wind. Better and more economical weed control results with less susceptibility to crop injury.

In compliance with the statue, the invention has been described in language more of less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. A debris and soil shaver for mounting to an agricultural apparatus adapted to travel across the ground surface in a predetermined direction, the agricultural apparatus including a frame member, the shaver comprising:

a disk-like member having a disk periphery defining a disk plane, and further having a central axis which is transverse with respect to the disk periphery;

a first support member, the disk being mounted to the first support member with the central transverse disk axis being arranged at an oblique angle relative to the predetermined direction of agricultural apparatus travel;

mounting means for vertically adjustably mounting the first support member to the agricultural apparatus frame member, the mounting means including an operative connection means between the frame member and first support member for allowing downwardly biased substantially free floating elevational movement, up and down, of the disk relative to the frame member as the agricultural apparatus travels across the ground surface, downward elevational movement of the disk relative to the frame member resulting in an increasingly greater angle of the disk plane from vertical; and surface angle adjusting means for varying the angle with which the disk plane engages the ground surface relative to vertical, said surface angle adjusting means comprising the vertical adjustability of the mounting means.

2. The debris and soil shaver of claim 1 including upward limiting means for limiting upward vertical movement of the disk.

3. The debris and soil shaver of claim 1 including downward limiting means for limiting downward vertical movement of the disk.

4. The debris and soil shaver of claim 1 including upward limiting means and downward limiting means for limiting the respective upward and downward vertical movement of the disk.

5. The debris and soil shaver of claim 2 wherein the upward limiting means comprises downwardly biased spring means.

6. The debris and soil shaver of claim 1 wherein:
the operative connection means comprises pivotal mounting means for pivotally mounting the first support member relative to the agricultural apparatus frame member for pivotal movement about a pivot axis, the pivot axis being arranged at an angle relative to the direction of agricultural apparatus travel, the pivot axis angle relative to the direction of agricultural apparatus travel being different than the oblique angle with which the disk central transverse axis is arranged relative to the direction of agricultural apparatus travel; and
the surface angle adjusting means comprising means for varying the height of the pivot axis above the ground surface.

7. The debris and soil shaver of claim 6 wherein the angle of the pivot axis relative to the direction of agricultural apparatus travel is ninety degrees.

8. The debris and soil shaver of claim 6 wherein the angle of the pivot axis relative to the direction of vehicle travel is adjustable.

9. The debris and soil shaver of claim 1 wherein the mounting means comprises:
a second support member;
the first support member being pivotally mounted to the second support member for pivotal movement about a pivot axis, the pivot axis being arranged at an angle relative to the direction of agricultural apparatus travel, the pivot axis angle relative to the direction of agricultural apparatus travel being different than the oblique angle with which the disk central transverse axis is arranged relative to the direction of agricultural apparatus travel;
the pivotal mounting of the first support member comprising the operative connection means whereby the disk is substantially freely movable vertically by pivot action of the first support member relative to the second support member; and
the surface angle adjusting means comprising an adjustable second support member mounting means for connecting the second support member to the agricultural apparatus frame member, the adjustable second support member mounting means including means for changing the position of the second support member relative to the ground surface for changing the height of the pivot axis above the ground to vary the angle with which the disk plane engages the ground surface relative to vertical.

10. The debris and soil shaver of claim 9 wherein the angle of the pivot axis relative to the direction of agricultural travel is ninety degrees.

11. A debris and soil shaver for mounting to an agricultural apparatus adapted to travel across the ground surface in a predetermined direction, the agricultural apparatus including a frame member, the shaver comprising:
a disk-like member having a disk periphery defining a disk plane, and further having a central axis which is transverse with respect to the disk periphery;
a first support member, the disk being rotatably mounted to the first support member about the central transverse disk axis, the central transverse disk axis being arranged at an oblique angle relative to the predetermined direction of agricultural apparatus travel;
a second support member, the first support member being pivotally mounted to the second support member for downwardly biased and relatively unrestrained up and down pivotal movement about a pivot axis, the pivot axis being spaced from and arranged at an angle relative to the central transverse disk axis, downward pivotal movement of the first support member relative to the second support member resulting in an increasingly greater angle of the disk plane from vertical; and
mounting means for connecting the second support member to the agricultural apparatus frame member, the mounting means including adjusting means for selectively moving the second support member relative to the frame member to adjust the elevation of the pivot axis above the ground surface to vary the angle with which the disk plane engages the ground surface relative to vertical.

12. The debris and soil shaver of claim 11 wherein the angle of the pivot axis relative to the direction of vehicle travel is adjustable.

13. The debris and soil shaver of claim 11 including upward limiting means for limiting the upward pivotal movement of the first support member relative to the second support member.

14. The debris and soil shaver of claim 11 including downward limiting means for limiting the downward pivotal movement of the first support member relative to the second support member.

15. The debris and soil shaver of claim 11 including upward limiting means and downward limiting means for limiting the respective upward and downward pivotal movement of the first support member relative to the second support member.

16. The debris and soil shaver of claim 13 wherein the upward limiting means comprise a tie rod and spring interconnected through a jack shaft.

17. The debris and soil shaver of claim 11 wherein the mounting means comprises a lockable clamp for clamping the second support member to the frame member.

18. A debris and soil shaver for mounting to a frame member of a seeding machine which places seed into the ground, the seeding machine being adapted to travel across the ground surface in a predetermined direction, the shaver being adapted to remove residue or soil along a location where the seeding machine places seed into the ground, the shaver comprising:
a disk-like member having a disk periphery defining a disk plane, and further having a central axis which is transverse with respect to the disk periphery;

a first support member, the disk being rotatably mounted to the first support member about the central transverse disk axis, the central transverse disk axis being arranged at an oblique angle relative to the predetermined direction of seeding machine travel;

pivotal mounting means for pivotally mounting the first support member to the seeding machine frame member for pivotal movement about a pivot axis, the pivot axis being normal to the direction of seeding machine travel, downward pivotal movement of the first support member relative to the seeding machine frame member resulting in an increasingly greater angle of the disk plane from vertical; and means for selectively varying the height of the pivot axis above the ground surface to vary the angle with which the disk plane engages the ground surface relative to vertical.

19. The debris and soil shaver of claim 18 wherein the pivotal mounting means comprises:

a second support member;

the first support member being pivotally mounted to the second support member which defines the pivot axis, the first support member being pivotal with respect to the second support member about the pivot axis; and the means for selectively varying the height of the pivot axis comprises an adjustable second support member mounting means for mounting the second support member to the seeding machine, the second support member mounting means including means for changing the position of the second support member relative to the ground surface for changing the height of the pivot axis above the ground to vary the angle with which the disk plane engages the ground surface relative to vertical in a predetermined manner.

20. A farm implement for no-till planting of seed into at least two seed rows, the farm implement including at least two longitudinally oriented tool bars having seed depositing devices positioned thereon, the farm implement being adapted to travel across the ground in a predetermined direction, the farm implement comprising:

at least two independently operable units for clearing residue or soil ahead of the seed depositing devices and directing said residue or soil laterally in opposite directions, each independently operably unit comprising:

a disk-like member having a disk periphery defining a disk plane, and further having a central axis which is transverse with respect to the disk periphery;

a first support member, the disk being mounted to the first support member with the central transverse disk axis being arranged at an oblique angle relative to the predetermined direction of farm implement travel, mounting means for mounting the first support member to one of the at least two longitudinally oriented tool bars, the mounting means including an operative connection means between the respective tool bar and first support member for allowing downwardly biased floating elevational movement of the disk relative to the tool bar as the farm implement travels across the ground surface; and one of said at least two independently operable units being mounted to one tool bar, the other of said at least two independently operable units being mounted to a tool bar adjacent the one tool bar, the disk of said one unit facing the disk of said other unit for causing soil or residue scraped by the one unit to flow to the other unit for concentrating soil or residue between seed rows.

21. The farm implement of claim 20 wherein the operative connection means is comprised of a pivotal connection of the first support member relative to the respective tool bar about a pivot axis whereby pivotal movement of the first support member about said pivot axis results in elevational movement of the disk relative to the tool bar.

22. The farm implement of claim 20 further having a pair of seed depositing devices mounted to said at least two longitudinally oriented tool bars for forming a pair of seed rows for each of said at least longitudinally oriented tool bars; and at least one independently operable unit being mounted to one of the at least two longitudinally oriented tool bars forward, with respect to the direction of implement travel, of each seed depositing device.

23. The farm implement of claim 20 including more than a pair of seed depositing devices mounted to each of said at least two longitudinally oriented tool bars.

24. The farm implement of claim 20 further comprising surface angle adjusting means for varying an angle of inclination with which the disk plane engages the ground surface.

25. The debris and soil shaver of claim 1 wherein, the surface angle adjusting means varies both the angle with which the disk plane engages the ground surface relative to vertical and the angle with which the disk plane engages the ground surface relative to the direction of travel; and downward elevational movement of the disk relative to the frame member resulting in an increasingly greater angle of the disk plane both from vertical and away from the direction of travel.

* * * * *